(12) United States Patent
Gary et al.

(10) Patent No.: US 7,672,117 B1
(45) Date of Patent: Mar. 2, 2010

(54) COVER ASSEMBLY FOR AN ELECTRONIC DEVICE INCLUDING A LAPTOP COMPUTER

(76) Inventors: Jacquelin T. Gary, 953 NE. 109 St., Miami, FL (US) 33161; Michael Ariza, 8920 SW. 160 St., Miami, FL (US) 33157

( * ) Notice: Subject to any disclaimer, the term of this patent is extended or adjusted under 35 U.S.C. 154(b) by 91 days.

(21) Appl. No.: 12/069,767

(22) Filed: Feb. 13, 2008

(51) Int. Cl.
*G06F 1/16* (2006.01)

(52) U.S. Cl. .................. 361/679.01; 224/614; 206/320; 428/354; 248/205.1

(58) Field of Classification Search .............. 206/308.1, 206/320; 361/679.27, 679.55, 679.22, 679.56, 361/679.31; 264/103; 428/214, 354; 248/205.1
See application file for complete search history.

(56) References Cited

U.S. PATENT DOCUMENTS

| | | | |
|---|---|---|---|
| 5,295,089 A | | 3/1994 | Ambasz |
| 5,607,054 A | * | 3/1997 | Hollingsworth ............. 206/320 |
| 5,775,497 A | | 7/1998 | Krulik |
| 5,931,297 A | | 8/1999 | Weill et al. |
| 6,163,450 A | * | 12/2000 | Kim ....................... 361/679.27 |
| 6,267,236 B1 | * | 7/2001 | Seok ........................... 206/320 |
| 6,775,128 B2 | | 8/2004 | Leitao |
| 6,887,002 B1 | | 5/2005 | Chen |
| 7,031,148 B1 | | 4/2006 | Lin |
| 7,035,093 B2 | * | 4/2006 | Imsand .................. 361/679.55 |
| 7,109,977 B2 | | 9/2006 | Durso |

* cited by examiner

*Primary Examiner*—Hung V Duong
(74) *Attorney, Agent, or Firm*—Malloy & Malloy, P.A.

(57) ABSTRACT

A cover assembly for an electronic device including a laptop or like portable computer, wherein the base is formed of an at least partially protective material and corresponds in dimension and configuration to an outer surface configuration of the electronic device. A retainer assembly comprises a plurality of retaining structures disposed within interior portions of the electronic computer and removably connected thereto so as to maintain the cover assembly in an operative position relative thereto. The retaining structures are disposed and dimensioned to facilitate a complete closure of the electronic device, while remaining at least partially, on the interior of the electronic device. An access structure includes at least one opening formed therein in aligned relation with connecting ports of the electronic device so as to facilitate access to the connecting ports through the at least one opening.

24 Claims, 5 Drawing Sheets

COVER ASSEMBLY FOR AN ELECTRONIC DEVICE INCLUDING A LAPTOP COMPUTER

BACKGROUND OF THE INVENTION

1. Field of the Invention

This invention relates to a cover assembly for an electronic device, specifically including a laptop computer, having a base removably mounted in an operative, protective position on the electronic device and movable therewith between open and closed positions. A retaining assembly is disposed at least partially on the interior of the electronic device and is structured to facilitate selective and complete closure thereof. The base is structured to provide access to the connecting ports and other operative components of the electronic device, whether it is in the open or closed positions.

2. Description of the Related Art

Various electronic devices, including laptop or notebook computers are currently being used in commercial, domestic and educational environments. In particular, the younger generation has made ubiquitous use of small, lightweight portable computers in a school or educational environment, wherein such portable computers are carried from class to class. The portability of the laptop computer also lends itself to being carried or utilized during travel on both private and commercial modes of transportation including airlines, automobiles and the like.

Therefore, laptop computers are designed for substantial portability thereby facilitating an individual's access in almost an unlimited number of locations. As such, one problem commonly associated with the transport and use of a portable computer is the requirement for at least some minimal protection against situations where the computer may be dropped or otherwise be subjected to other traumatic forces. In order to overcome such potential problems, there have been developed a variety of different "carrying case" structures. These known structures are similar to luggage type products, inclusive of shoulder straps, handles, etc.

These known carrying cases are available in a wide variety of styles and sizes and are used not only to protect the computer against damage but also to facilitate the transport of the computer in a convenient and comfortable manner. Also, many of the known carrying case devices are structured to protect the portable computer against adverse weather conditions, as well as damage from being dropped, etc. However, many of the known structures of this type are bulky, somewhat heavy and commonly involve relatively complicated enclosure or locking assemblies. As such, known devices of this type mandate that the computer be removed from the interior of the device, placed on an appropriate support structure then disposed in an open orientation for use.

Accordingly, there is a long existing need in the area of cover assemblies for portable computers, which provide protection from both adverse weather conditions as well as traumatic impact. Such a proposed cover assembly should be lightweight, easily mounted in an operative, protective position on the laptop computer in an efficient manner. Further, such a proposed cover assembly should be capable of maintaining the preferred operative position in protective, covering relation to the portable computer or other electronic device during its use, storage or transport. More specifically, the operative position of the proposed cover assembly is maintained when the computer, etc. is in an open position, such as when it is being used, as well as a closed position, such as when the computer is being stored or carried. The ability to maintain the proposed cover assembly in its operative position thereby eliminates the necessity of removing it in order to use the portable computer as is common place with most protective, carrying case type of structures, now available.

Therefore, a proposed cover assembly of the present invention should be formed of a lightweight material having capabilities which facilitate the protection of the computer from adverse weather conditions, as well traumatic force or impact. Moreover, the various structural and operative features of such a proposed cover assembly should enable the portable computer or like device to be used in an intended, conventional manner. Such conventional use would include it being opened and fully closed, while certain retaining structures associated with the proposed cover assembly remain in place. Thereby the proposed cover assembly would be securely but removably disposed in its intended operative position without interfering with the orientation or use of the portable computer or other electronic device.

SUMMARY OF THE INVENTION

The present invention is directed to a cover assembly dimensioned and configured to facilitate its use on an electronic device specifically, but not exclusively, a laptop, notebook or similar type portable computer. Moreover, the cover assembly comprises a base formed from a protective, lightweight, weather resistant, cushioning material such as, but not limited to, Neoprene™. Further, the overall dimension of the cover assembly is such as to overlie, cover and therefore protect at least a majority of the outer surfaces of the top, bottom and rear portions of the portable computer or other electronic device. More specifically, the top, bottom and intermediate segments of the base may move with the top, bottom and rear portions of the electronic device to which they are attached.

In order to securely, but removably maintain the cover assembly in its intended operative position, a retainer assembly is secured thereto. The retainer assembly includes a plurality of retaining elements each fixedly connected to appropriate portions of the cover assembly necessary to maintain it in the aforementioned protective, operative position on the electronic device. Moreover, the disposition, structure and configuration of the plurality of retaining structures are such that they are disposed at least partially on an interior of the electronic device in a manner which facilitates disposition of the electronic device in a completely closed position.

By way of example, as commonly structured and utilized, a conventional laptop computer includes a top portion comprising the display screen of the computer and a bottom portion including operative circuitry and wiring and a keyboard. The top portion is pivotally connected to the bottom portion such that the laptop computer may assume a completely open position for utilization or a completely closed position. In the closed position, the top portion releasably interlocks with the bottom portion. As such, the plurality of retainer assemblies are capable of being removably connected to appropriate and correspondingly disposed parts of the computer or other electronic device such that they are disposed at least partially on the interior of the laptop device when in a closed position. Accordingly, there is a cooperative disposition and structuring of the plurality of retainer structures such that they may be disclosed in substantially overlapping or confronting relation to one another. Alternatively, other embodiments of the cover assembly include an offset but substantially adjacent positioning of the retaining structures relative to one another on the interior of the electronic device or laptop computer when it is in the aforementioned closed position.

Other structural features of the cover assembly of the present invention include an access structure which comprises at least one opening or window formed in the base. In one preferred embodiment the intermediate segment of the base contains the at least one opening or window extending there through. This at least one opening is disposed in aligned relation to connecting ports and other operative components of the electronic device or portable computer so as to facilitate access thereto when it is in either the open or closed position. Similarly, the access structure may additionally include one or more open peripheral sides such as, but not limited to, the opposite peripheral sides of the base as well as the open front side thereof.

By virtue of the dimensions, positions and configurations of the open peripheral sides, access is provided to the connecting ports and/or DVD/ROM, speakers, vent portions, etc. which may typically be disposed about the peripheral sides of the computer or electronic device. The front peripheral side, which is also included in the access structure is sufficiently disposed, configured and dimensioned to provide clear access to the locking/unlocking feature serving to removably interconnect the top portion to the bottom portion of the electronic device, when in a closed position.

Yet additional structural features of the cover assembly of the present invention also include a vent assembly comprising an apertured construction or a plurality of substantially adjacent, spaced apart apertures formed in a preferred location on the base and extending therethrough. This apertured construction would therefore be disposed in overlying or direct fluid communication with the vent facilities, including air intake and/or air passage vents formed on the electronic device or laptop computer to facilitate the cooling thereof during operation. It is noted that the aforementioned vent assembly, including the apertured construction, may be disposed at various locations and/or a plurality of appropriate locations on the base in order to provide fluid communication between one or more vents on the electronic device and the exterior of the cover assembly.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
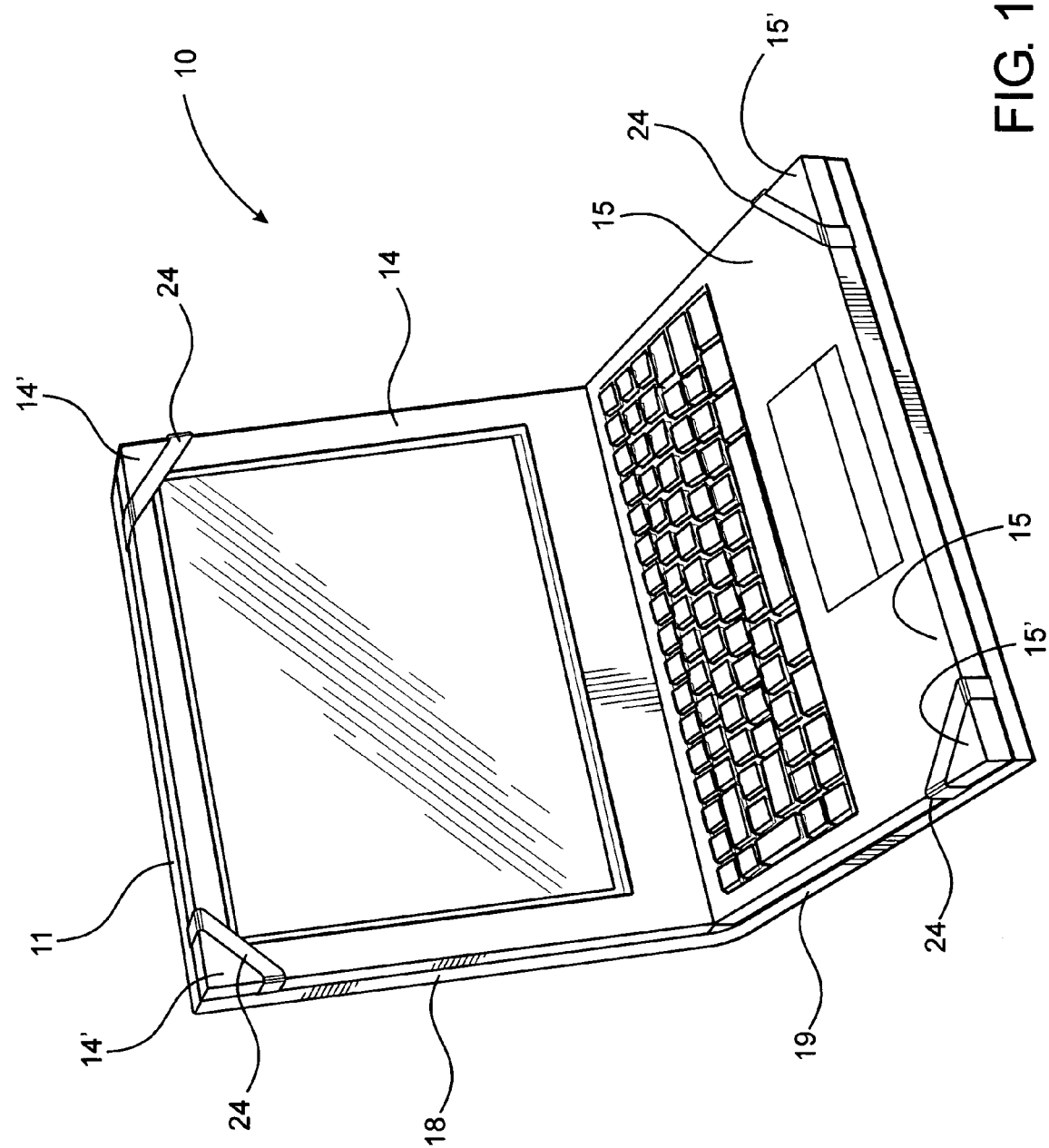
FIG. 1 is a front perspective view of one preferred embodiment of the cover assembly of the present invention mounted on an electronic device, such as a portable, laptop computer in an operative position.

As shown in the accompanying drawings, the present invention is directed to a cover assembly, generally indicated as 10, structured to cover and protect an electronic device, especially, but not limited to, a portable, laptop or like computer generally indicated as 12. It is emphasized that while the cover assembly 10 is particularly structured, dimensioned and configured to be utilized with a variety of portable computers, it may also be used with a variety of other electronic devices specifically of the type including a top portion 14, a bottom portion 15 and a back portion 16.

As such, the cover assembly 10 comprises a base 11 having a top segment 18, a bottom segment 19 and an intermediate segment 20. The intermediate segment 20 may be integrally or otherwise fixedly connected to the other segments 18 and 19 and serves to movably interconnect these top and bottom segments 18 and 19. Also, the base 11 of the cover assembly 10, specifically including the top, bottom and intermediate segments 18 through 20, are respectively dimensioned and configured to overlie a significant or major portion of the outer surface of each of the top, bottom and rear portions 14 through 16 of the portable computer or other electronic device 12.

Figure 2:
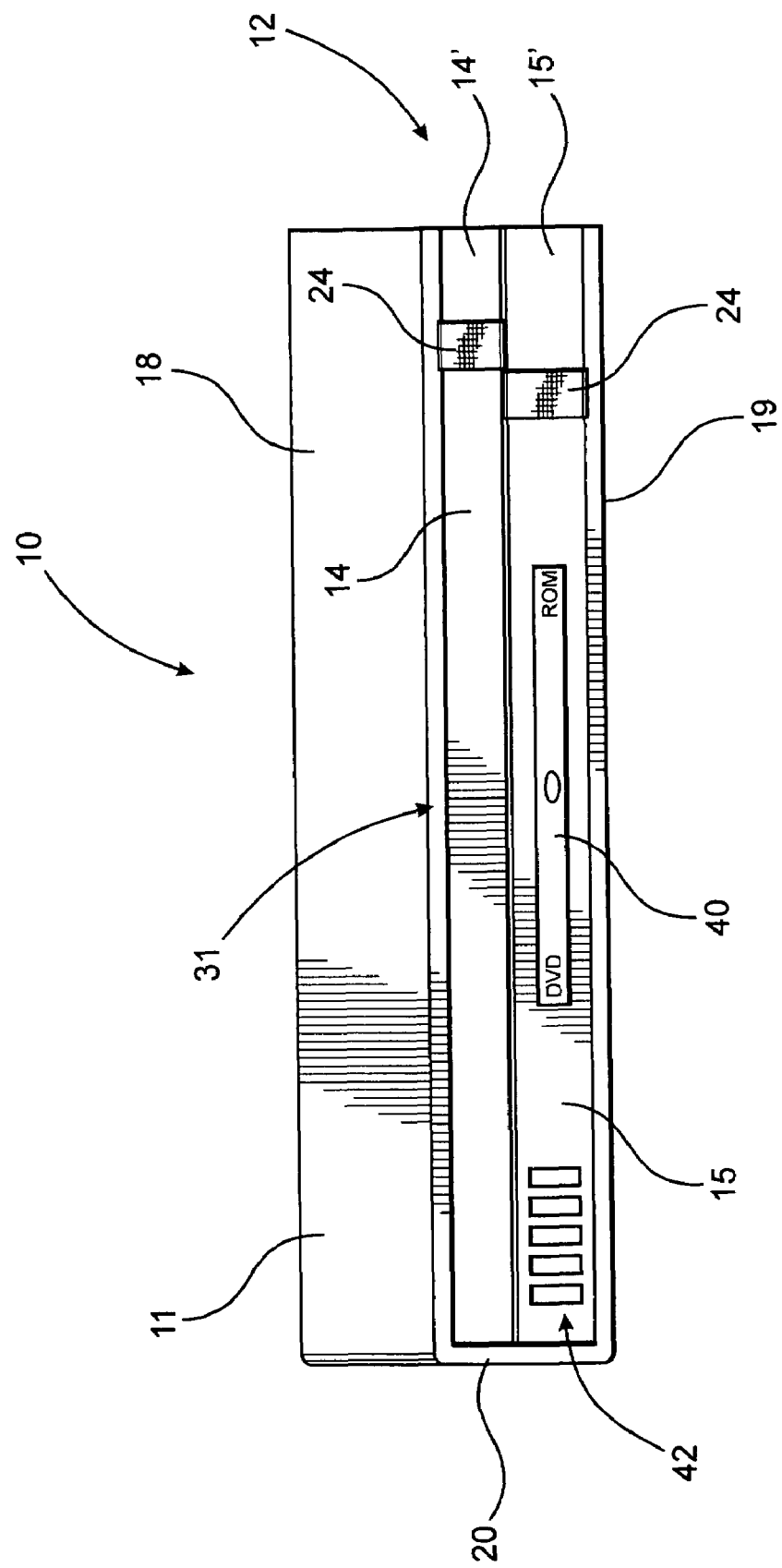
FIG. 2 is a perspective side view of the embodiment of FIG. 1, wherein the electronic device is in a closed position.
Figure 3:
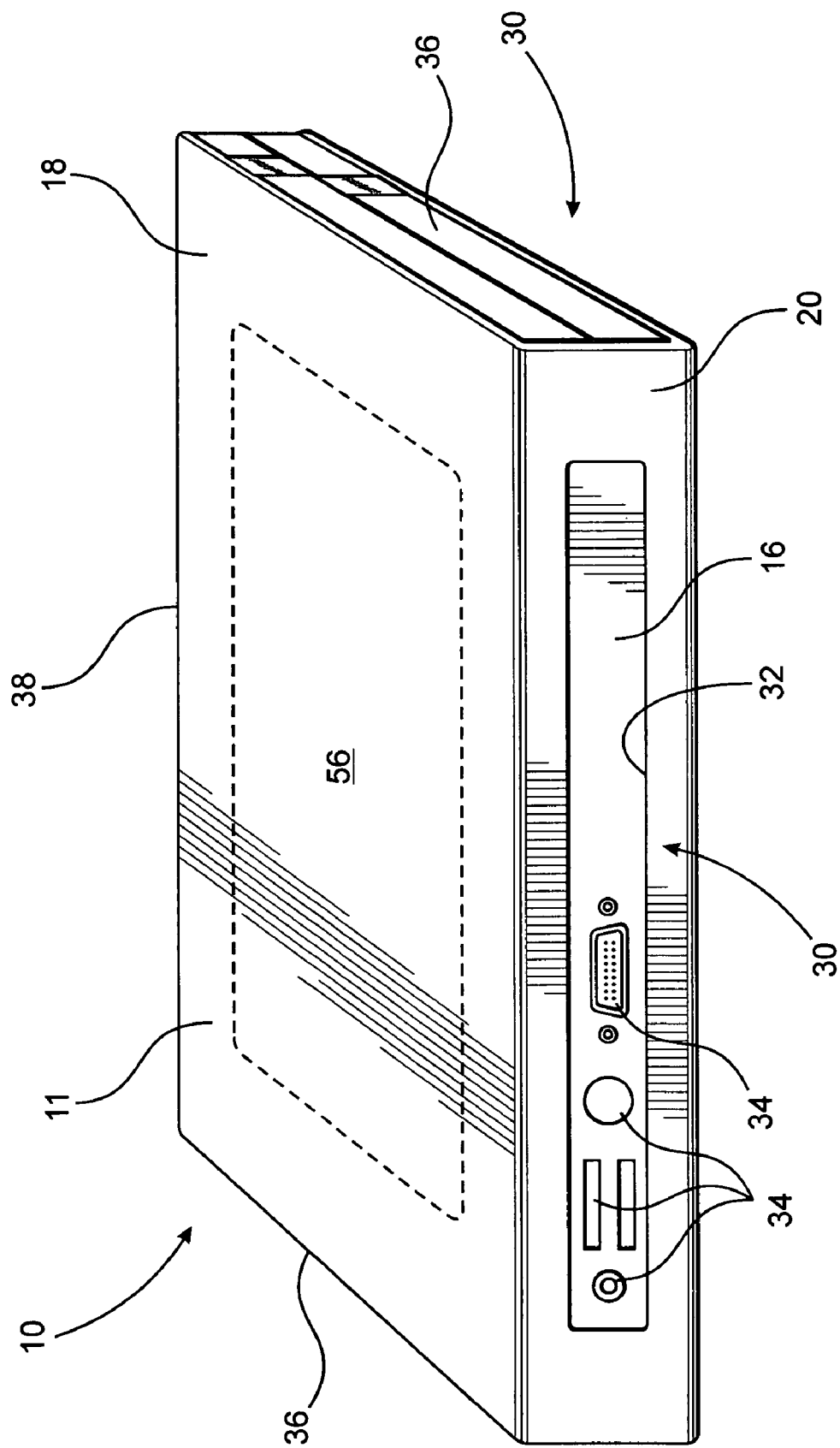
FIG. 3 is a rear perspective view of the embodiment of FIGS. 1 and 2.
Figure 4:
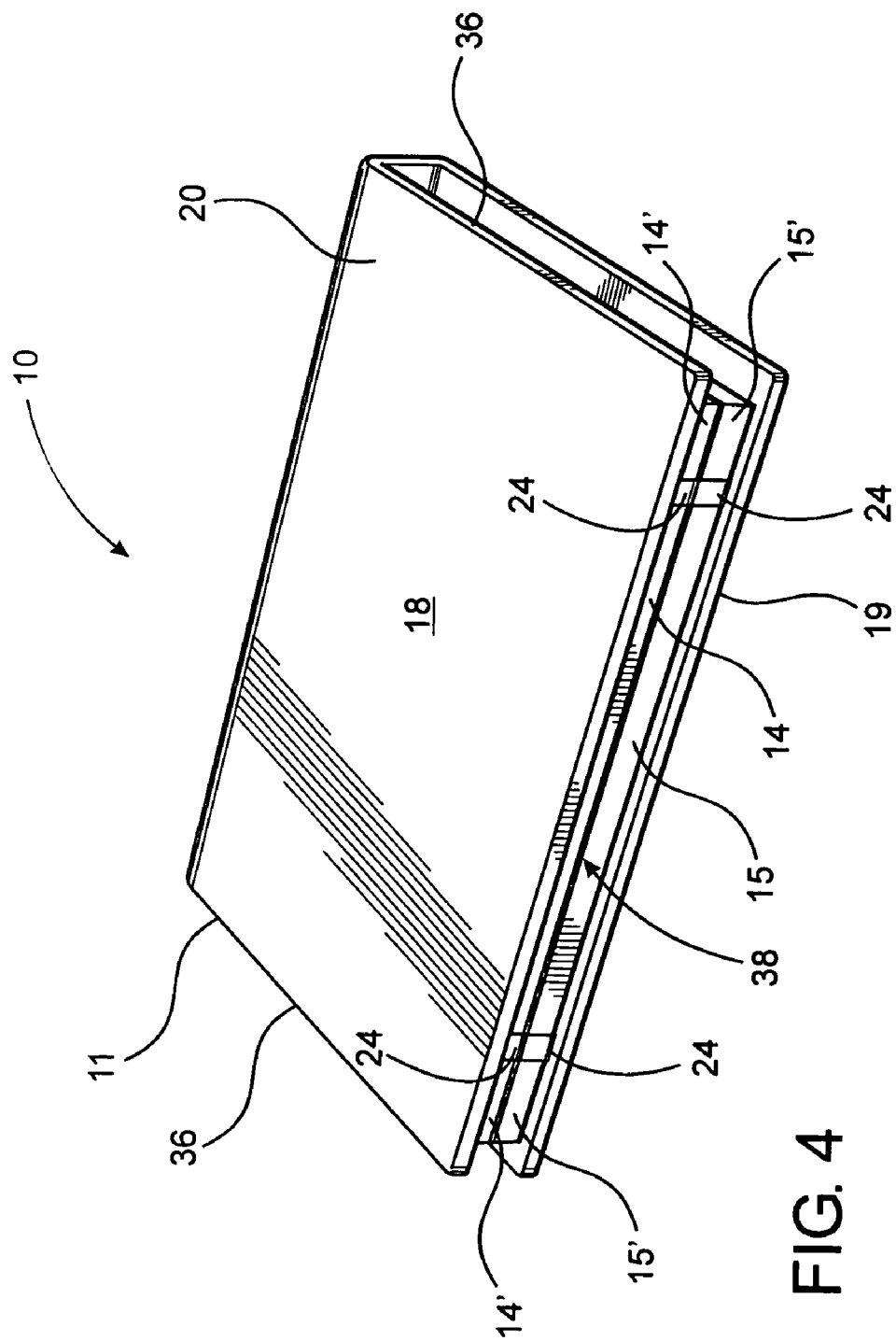
FIG. 4 is a perspective front view of the embodiment of FIGS. 1 through 3.

As with most conventional portable computers 12, the top portion and the bottom portions 14 and 15 are pivotally connected to one another and are selectively disposable between an open position as represented in FIG. 1 and a closed position as represented in FIGS. 2 through 4. The versatility of the cover assembly 10 is such that each of the top, bottom and rear segments 18 through 20 are individually dimensioned and configured to overlie and substantially correspond to the dimension and configuration of the respective portions 14, 15 and 16 with which they are correspondingly disposed.

Also, the base 11 of the cover assembly 10, including each of the top, bottom and rear segments 18 through 20, is formed of a relatively soft, at least partially flexible and resilient, cushioning material such as, but not limited to Neoprene™. Therefore, the cushioning material of which the base 11 is formed provides significant protection of the structure of the portable computer or electronic device 12, specifically including the outer surface portions thereof, against traumatic forces.

It should be apparent that the specific dimensions and configurations of the base 11 may vary so as to be readily usable on different models, styles or brands of electronic devices or laptop computers 12. However, the variation in such overall configuration and dimension does not derogatorily affect the uniqueness of the cover assembly 10 but rather adds to its versatility.

As also represented in FIGS. 1 through 4, the cover assembly 10 comprises a retainer assembly preferably including a plurality of retainer structures 24, securely but movably connected to the base 11 preferably adjacent to the four corners thereof, as clearly represented in FIG. 1. Each of the retainer structures 24 have the opposite ends thereof fixedly secured preferably to the inner surfaces of the top and bottom segments 18 and 19 adjacent the outer corners thereof. In addition, each of the retainer structures 24 may at least partially surround the corner portions 14' and 15' of the top and bottom portions 14 and 15 of the electronic device or laptop computer 12. Therefore, the base 11 is removably but securely disposed in its operative position on the electronic device 12. Such operative position is further defined by the top, bottom and intermediate segments 18 through 20 disposed in overlying, at least partially covering relation to the corresponding top, bottom and rear portions 14 through 16, as set forth above, of the electronic device 12. Further, due to the fact that the base 11 is formed of a flexible material, the various top, bottom and intermediate segments 18 through 20 are movable with the corresponding top, bottom and rear portions 14 through 16, respectively, of the electronic device 12, such as when the electronic device is disposed between the open position and the closed position as represented in FIGS. 1 through 4.

Additional features of the retaining assembly specifically including the preferably four retaining structures 24, include their disposition and structure facilitating the selective positioning of the top and bottom portions 14 and 15 in a fully closed position as clearly represented in FIGS. 2-4. As such, the correspondingly disposed retaining structures 24, when the electronic device 12 is in the closed position, may be disposed in a side by side, offset but substantially adjacent relation to one another when the electronic device or portable computer 12 is in the closed position. However, with reference to FIG. 4, another embodiment of the retainer assembly, including the preferably four retaining structures 24, is their disposition in overlapping, substantially confronting relation to one another. In the embodiment of FIG. 4, the retaining structures 24 are disposed and structured to be at least minimally compressed when in overlapping, confronting relation to one another. This confronting relation to one another further facilitates the complete closure of the top and bottom portions 14 and 15 of the laptop computer or electronic device 12.

With primary reference to FIGS. 1 and 2, another feature of the cover assembly 10 of the present invention is the provision of an access structure 30, at least partially formed in the base 11. More specifically, the embodiment of FIG. 3, the access structure 30 comprises at least one opening or window 32 formed in the rear segment 20 of the base 11 and extending therethrough. The one opening 32 is dimensioned and configured to be disposed in substantially aligned relation with connecting ports or other facilities or operative components located in the rear portion 16 of the computer 12. Such connecting ports and other input facilities and operative features are collectively and generally indicated as 34 and may include one or more USB ports, serial ports, etc. As such, the at least one opening 32 is disposed in aligned relation to the connecting ports, etc. 34 and thereby facilitates clear and easy access thereto through the one opening 32 of the base 11, when the electronic device or laptop computer 12 is either in the open or closed position. In addition, the access structure 30 may also include one or a plurality of open peripheral sides of the base 11 including opposite lateral peripheral sides 36 and an open front side 38.

With primary reference to FIG. 4, the open peripheral sides 36 extend along opposite sides of the base 11 and are more prominent when the base 11 is in its operative position and the laptop computer 12 is in its closed position. As such, the open peripheral sides 36 and/or 38 are disposed so as to provide clear access to the various input facilities, including a DVD/ROM as at 40 and one or more input or output vents as at 42, as well as a variety of other connecting ports and other operative facilities as is common with portable laptop computers and other electronic devices.

Figure 5:
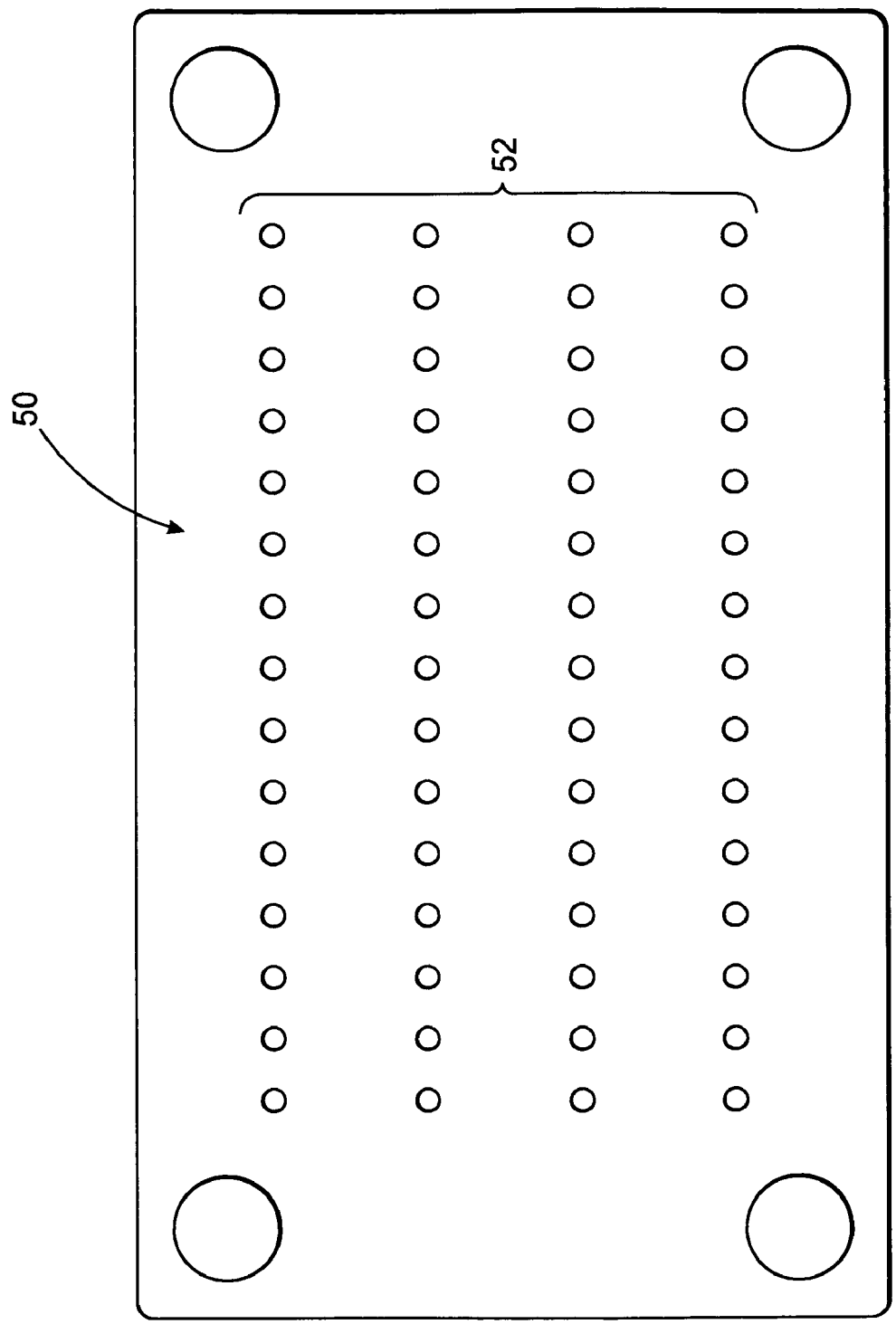
FIG. 5 is a bottom view representing a vent assembly formed in the cover assembly of the embodiments of FIGS. 1 through 3 such as, but not limited to, being formed in a bottom segment of the cover assembly.

With primary reference to FIG. 5, an additional preferred embodiment of the present invention also includes a vent assembly generally indicated as 50. The vent assembly preferably includes a grouping, array or overall apertured construction generally and collectedly indicated as 52. The plurality of apertures defining the apertured construction 52 may be collectively arranged in a variety of different configurations and may be disposed on and through the top, bottom and/or intermediate segments 18 through 20 of the base 11. As such, the vent assembly 50, including the apertured construction 52 is disposed in overlying or fluid communication with one or more vent structures formed in the electronic device or portable computer 12. Therefore, the vent assembly 50 is not intended to be limited to any one of the plurality of top, bottom and intermediate segments 18 through 20 of the base 11, but may be positioned at various locations in order to correspond to the disposition of one or more vents of the electronic device or laptop computer 12.

Yet additional features associated with the cover assembly 10 may also include a display area or display field 56 disposed on or being a part of the exterior surface of one or more segments 18 through 20 of the base 11. The display field or area 56 is such as to accommodate the disposition of any type of indicia, logo, advertisement, informative data, etc. thereon. Therefore, such indicia, etc. mounted or otherwise disposed on the displayed field or area 56 is readily viewable from an exterior of the base 11 whether it is in its open or closed position in accordance with the position or orientation of the electronic device or laptop computer 12.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A cover assembly for an electronic device including a portable computer, said cover assembly comprising:
    a base,
    said base dimensioned and configured to correspond to an outer surface of the electronic device,
    a retainer assembly disposed and structured to removably secure said base in an operative position on the electronic device,
    said base structured to move with corresponding portions of the electronic device between an open position and a closed position when said base is in said operative position, and
    an access structure disposed on said base in aligned relation to at least connecting ports on the electronic device, when said base is in said operative position.

2. A cover assembly as recited in claim 1 wherein said base is at least partially formed of a protective, cushioning material.

3. A cover assembly as recited in claim 2 wherein said protective, cushioning material comprises Neoprene™.

4. A cover assembly as recited in claim 1 wherein said operative position comprises said base disposed in overlying, covering relation to at least a majority of an outer surface of the electronic device.

5. A cover assembly as recited in claim 4 wherein said operative position further comprises said base disposed in overlying, covering relation with substantially the entire outer surface of the electronic device absent connecting ports thereof.

6. A cover assembly as recited in claim 1 wherein said retainer assembly comprises a plurality of retaining structures at least partially disposed within interior portions of the electronic device in retaining engagement with corresponding portions of the electronic device.

7. A cover assembly as recited in claim 6 wherein said retaining structures are movable with and removable from the corresponding portions of the electronic device.

8. A cover assembly as recited in claim 7 wherein said retaining structures are structured and dimensioned to permit a complete closure of the electronic device when said base is in said operative position and the electronic device is in the closed position.

9. A cover assembly as recited in claim 8 wherein correspondingly positioned ones of said plurality of retaining structures are disposed in offset relation to one another when the electronic device is in the closed position.

10. A cover assembly as recited in claim 8 wherein correspondingly positioned ones of said retaining structures are disposed in substantially aligned, confronting relation to one another when the electronic device is in a closed position.

11. A cover assembly as recited in claim 1 wherein said access structure comprises at least one opening formed in said base in aligned relation to correspondingly disposed ones of the connecting ports, said opening dimensioned and configured to provide access to the corresponding connecting ports.

12. A cover assembly as recited in claim 11 wherein said access structure comprises at least one open peripheral side of said base, said open peripheral side dimensioned and configured to provide access to correspondingly disposed connecting ports of the electronic device.

13. A cover assembly as recited in claim 1 wherein said access structure comprises at least one open peripheral side of said base, said open peripheral side dimensioned and configured to provide access to correspondingly positioned connecting ports of the electronic device.

14. A cover assembly as recited in claim 1 further comprising a display field disposed on at least a portion of an outer, exposed surface of the base, said display field dimensioned and configured to include indicia thereon.

15. A cover assembly for an electronic device including a portable computer, said cover assembly comprising:
a base dimensioned and configured to correspond to at least a majority of an outer surface of the electronic device,
a retainer assembly comprising a plurality of retaining structures disposed and structured to position said base in an operative position on the portable computer,
said retaining structures at least partially disposed within interior portions of the portable computer in removably retaining engagement with corresponding portions of the portable computer, and
an access structure including at least one opening formed on said base and disposed in aligned, exposing relation to at least one connector port on the portable computer, when the base is in said operative position.

16. A cover assembly as recited in claim 15 wherein said base comprises top, bottom and intermediate segments respectively dimensioned and configured for disposition in covering relation to corresponding top, bottom and rear portions of the portable computer, when said base is in said operative position.

17. A cover assembly as recited in claim 16 wherein said one opening is formed in said intermediate segment in aligned, exposing relation to a plurality of connecting ports disposed on the rear portion of the portable computer.

18. A cover assembly as recited in claim 15 wherein said retaining structures are structured and dimensioned to permit a complete closure of the electronic device when said base is in said operative position and the electronic device is in the closed position.

19. A cover assembly as recited in claim 18 wherein correspondingly positioned ones of said plurality of retaining structures are disposed in offset relation to one another when the electronic device is in the closed position.

20. A cover assembly as recited in claim 18 wherein correspondingly positioned ones of said retaining structures are disposed in substantially aligned, confronting relation to one another when the electronic device is in a closed position.

21. A cover assembly as recited in claim 15 wherein each of said plurality of retaining structures comprises an elongated configuration having opposite ends thereof fixedly connected to said base.

22. A cover assembly as recited in claim 21 wherein said retaining structures are disposed on said base and cooperatively structured therewith to removably and partially surround corner portions of the portable computer when said base is in said operative position.

23. A cover assembly as recited in claim 15 further comprising a vent assembly comprising a portion of said base having an apertured construction structured and disposed to establish fluid communication through said base and between a vent assembly of the portable computer and an exterior of the said base.

24. A cover assembly as recited in claim 15 further comprising a display field disposed on at least a portion of an outer, exposed surface of the base, said display field dimensioned and configured to include indicia thereon.

* * * * *